United States Patent [19]
Andersson

[11] 4,301,696
[45] Nov. 24, 1981

[54] METHOD AND AN ARRANGEMENT FOR THE COMPENSATION OF INERTIA FORCES IN THE INDEXING MOVEMENT OF A MACHINE ELEMENT

[75] Inventor: Pär M. Andersson, Bjärred, Sweden

[73] Assignee: Tetra Pak International AB, Lund, Sweden

[21] Appl. No.: 85,731

[22] Filed: Oct. 17, 1979

[30] Foreign Application Priority Data

Oct. 25, 1978 [SE] Sweden ............................. 7811077

[51] Int. Cl.³ ...................... B23Q 17/00; F16H 53/06
[52] U.S. Cl. ......................................... 74/821; 74/569
[58] Field of Search ....................... 74/821, 569, 36, 54

[56] References Cited
U.S. PATENT DOCUMENTS 3,139,761  7/1964  Gindroz, Jr. .......................... 74/36
3,854,814  12/1974  Jones ..................................... 74/569

FOREIGN PATENT DOCUMENTS 462612  5/1967  Japan ....................................... 74/54

Primary Examiner—Kenneth Dorner
Attorney, Agent, or Firm—Burns, Doane, Swecker & Mathis

[57] ABSTRACT

When machine elements having a large mass are indexed, i.e. subjected to short, quick rotating movements, very great acceleration and deceleration forces must be transmitted via the driving means of the machine. Due to vibrations occurring, increasing the stresses on the driving means, the driving means must be dimensioned accordingly. The present invention provides a method and an arrangement for the compensation of the forces applied and thus for reducing the stresses which occur. This is performed by combining the indexing machine element with a cam disc which is contacted by a number of spring-loaded cam followers, whereby the cam disc has such a shape that the cam follower decelerates and accelerates the cam disc following the desired movement pattern of the machine element.

9 Claims, 2 Drawing Figures

METHOD AND AN ARRANGEMENT FOR THE COMPENSATION OF INERTIA FORCES IN THE INDEXING MOVEMENT OF A MACHINE ELEMENT

BACKGROUND AND SUMMARY OF THE INVENTION

The present invention relates to a method for compensating inertia forces in the indexing movement of a machine element and an arrangement for the realization of the method.

It is customary in mechanical engineering for machine elements to be moved stepwise between predetermined positions, that is to say, to be indexed. In particular a stepwise rotation of a machine element according to a predetermined pattern is frequently used. At each rotation of the machine element at least one acceleration or deceleration occurs. Occasionally there is also an intermediate period during which the machine element is driven at constant speed. If the machine member is large, that is to say, if it has a large mass, these periodically recurring changes in speed of the machine element mean that very substantial acceleration and deceleration forces have to be applied.

On indexing (e.g. wheels of a large diameter and great mass) between different stationary positions, the inertia forces will be considerable, especially if the indexing times are short. The driving of the indexing machine element therefore requires the application of substantial forces. Even if the machine element is rotated the whole time in one direction only, shocks and vibrations arise on acceleration and deceleration of the machine element. The shocks and vibrations in addition to causing noise may also bring about damage to motor, driving unit and the machine as a whole. The result will be that the driving machine components have to be constructed for a maximum stress which occurs only during a short portion of the total working time, thus making the machine unnecessarily expensive.

Since indexing driving of machine elements is customary in mechanical engineering, it is a desirable object in general to provide a method which eliminates the problem described and which makes it possible to use smaller and consequently cheaper machine elements.

This object has been achieved in accordance with the present invention in that a method for the compensating of inertia forces during indexing movements has been given the characteristic that the machine element is connected to a cam disc against which a spring-loaded cam follower is pressed. The force of the cam follower is such that the cam disc is decelerated during the indexing movement when the cam follower is moved by the cam disc in the direction against the effect of the spring and is accelerated when the cam follower moves with the effect of the spring.

A preferred embodiment of the method in accordance with the invention has been given the further characteristic that the cam follower, via the cam disc, accelerates or decelerates the machine element as the case may be, so that its speed in the one end position of the cam follower is zero and in the other end position the speed of the cam follower is a maximum.

A further embodiment of the method in accordance with the invention has been given the further characteristic that on standstill of the cam disc the cam follower is moved to the one end position.

It is a further object of the present invention to provide an arrangement for the realization of the method. The arrangement by absorbing, storing and delivering energy provides a reduction and smoothing out of the applied driving force required, and consequently also a reduction of the vibrations occurring during the driving.

It is a further object of the present invention to provide an arrangement for the realization of the method which arrangement is simple and uncomplicated.

These and other objects have been achieved in accordance with the invention in that an arrangement for the realization of the method relating to the indexing movement of a machine element has been given the characteristic that the machine element is connected to a cam disc against which rests a spring-loaded cam follower. The shape of the cam disc is such that the cam follower during the movement of the machine element from standstill first accelerates and then decelerates the cam disc.

A preferred embodiment of the arrangement in accordance with the invention has been given the further characteristic that the cam disc has cam peaks which are situated so that the cam follower at each stop of movement is urged against the effect of the spring force into an end position in contact with one cam peak.

A further embodiment of the arrangement in accordance with the invention has been given the further characteristic that on a cam disc of the radial type the cam follower is acted on by the spring in the direction towards the axis of rotation of the cam.

A further embodiment of the arrangement in accordance with the invention has been given the further characteristic that the cam follower is in the form of a pivotably supported lever rod, one end of which rests via intermediate rolling elements against the cam disc and the other end of which is connected via a spring element to the machine frame.

A further embodiment of the arrangement in accordance with the invention has been given the further characteristic that the spring element is an air cylinder.

A further embodiment of the arrangement in accordance with the invention has been given the further characteristic that it is provided with two cam followers which rest against the cam at a spacing of 180°.

A further embodiment of the arrangement in accordance with the invention has been given the further characteristic that the number of cam peaks is equal to the number of stops of movement per full revolution of the cam disc.

BRIEF DESCRIPTION OF THE DRAWING

The method in accordance with the invention as well as a preferred embodiment of an arrangement for the realization of the method will be described in detail in the following with special reference to the enclosed schematic drawings wherein like members bear like reference numerals and wherein.

Figure 1:
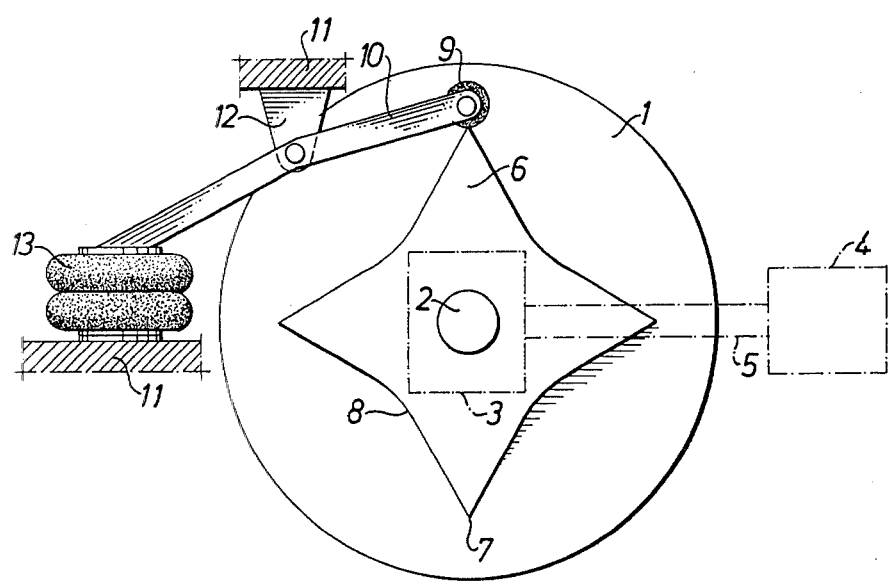
FIG. 1 is a schematic view of a first embodiment of an arrangement in accordance with the invention as it may be constructed in the case of a machine element in the form of a wheel which performs an indexing rotatory movement.

For the sake of clarity only the parts necessary for an understanding of the invention have been illustrated.

DETAILED DESCRIPTION OF THE PREFERRED EMBODIMENT

With reference to the single drawing FIGURE, a machine element 1 in the form of a wheel of a large mass is to be indexed four times per revolution, that is to say, with each indexing a rotation of the wheel by a quarter revolution takes place. The wheel is supported by a shaft 2 which constitutes the output shaft of an indexing gear 3 of conventional type. The indexing gear 3 as well as an electric driving motor 4 and a shaft 5 which connects the indexing gear 3 and the driving motor 4 are of the conventional type and are indicated by dash-dotted lines.

Adjoining the machine element 1, and fitted e.g. on the shaft 2, is a radial cam disc 6 which is adapted to the indexing movement of the machine element 1 inasmuch as it has a number of cam peaks 7 corresponding to the number of indexing steps per revolution. With reference to the embodiment in the drawing FIGURE, four cam peaks are arranged with a spacing of 90° around the cam disc. Four cam valleys 8 are situated symmetrically between the cam peaks 7 and are connected to the cam peaks 7 through the rising and falling cam sections respectively.

A spring-loaded cam follower rests against the cam disc. The spring loaded cam follower comprises a pulley 9 which is supported so that it can freely rotate on the end of one arm of a double-armed lever rod 10. The lever rod 10 is pivotably supported in a bracket 12 fitted to the machine frame 11 and the end of the lever rod, which is opposite to the pulley 9, is connected via a spring element 13 to the machine frame 11. The spring element 13 may be comprised of a mechanical spring or of a pneumatic piston and cylinder assembly. In a preferred embodiment, the spring element 13 consists of a pneumatic bellows cylinder. The pressure in the bellows cylinder is controlled by means of a supply of compressed air so that the pulley 9 via the lever rod 10 exerts a certain constant force directed towards the cam disc which is determined in accordance with the mass of the machine element, the shape of cam disc and cam follower, the rate of indexing etc, a routine operation for the expert which does not have to be described in detail here.

In operation, and with reference to the drawing figure, the machine element is indexed with the help of the driving motor 4 and the indexing gear box 3 connected to the driving motor via the transmission shaft 5. The machine element 1 is rotated on each indexing by 90° and indexing or movement stops thus occur four times per complete revolution. Each rotation over a quarter revolution comprises an acceleration during a rotation about 45°, and directly following this a similarly uniform deceleration during a further rotation about 45°. This pattern of movement controls the design of the cam disc 6 which has to have a cam peak for each indexing stop. Furthermore, the cam disc is so connected to the machine element that the pulley 9 of the cam follower 10 resting against the cam disc is on a cam peak at every indexing stop, as illustrated in the figure. As soon as the cam disc 6 with the help of the driving motor 4 and intermediate elements has commenced an indexing movement, the pulley 9 resting against the cam disc will be moved by the spring element 13 in the direction of the axis of rotation of the cam disc at the same time as the pulley rolls down the cam disc in the direction towards a cam valley 8. As a result the force of the spring element 13 will be transmitted to the cam disc 6 as a torque which tends to accelerate the rotatory movement of the cam disc. When the pulley 9 attains the cam valley 8, the cam disc 6 has reached its maximum speed of rotation. The pulley will immediately thereafter roll along the ascending portion of the cam disc following the cam valley, as a result of which a torque directed in the opposite direction is obtained which tends to decelerate the rotatory movement of the cam disc. With a preferred shape of the cam disc the deceleration would be such that the rotatory movement of the machine element is braked completely as the pulley 9 of the cam follower 10 reaches another cam peak 7. However, owing to friction losses and inaccuracy in the construction of the spring element and cam disc this ideal condition cannot be attained without the help of the driving motor 4 which corrects the faults caused by these factors and ensures jointly with the indexing gear 3 that the indexing movement follows the desired course. However, the driving motor no longer must be constructed so that all by itself it accelerates and decelerates the machine element, as has previously been the case. The spring element 13 together with the cam follower and the cam disc take over the bulk of the acceleration and deceleration work. While the driving motor 4 is still needed to contribute a certain additional force, the principal task of the driving motor is to control the indexing movement so that the stop of the movement takes place when the machine element is in exactly the right position.

Figure 2:
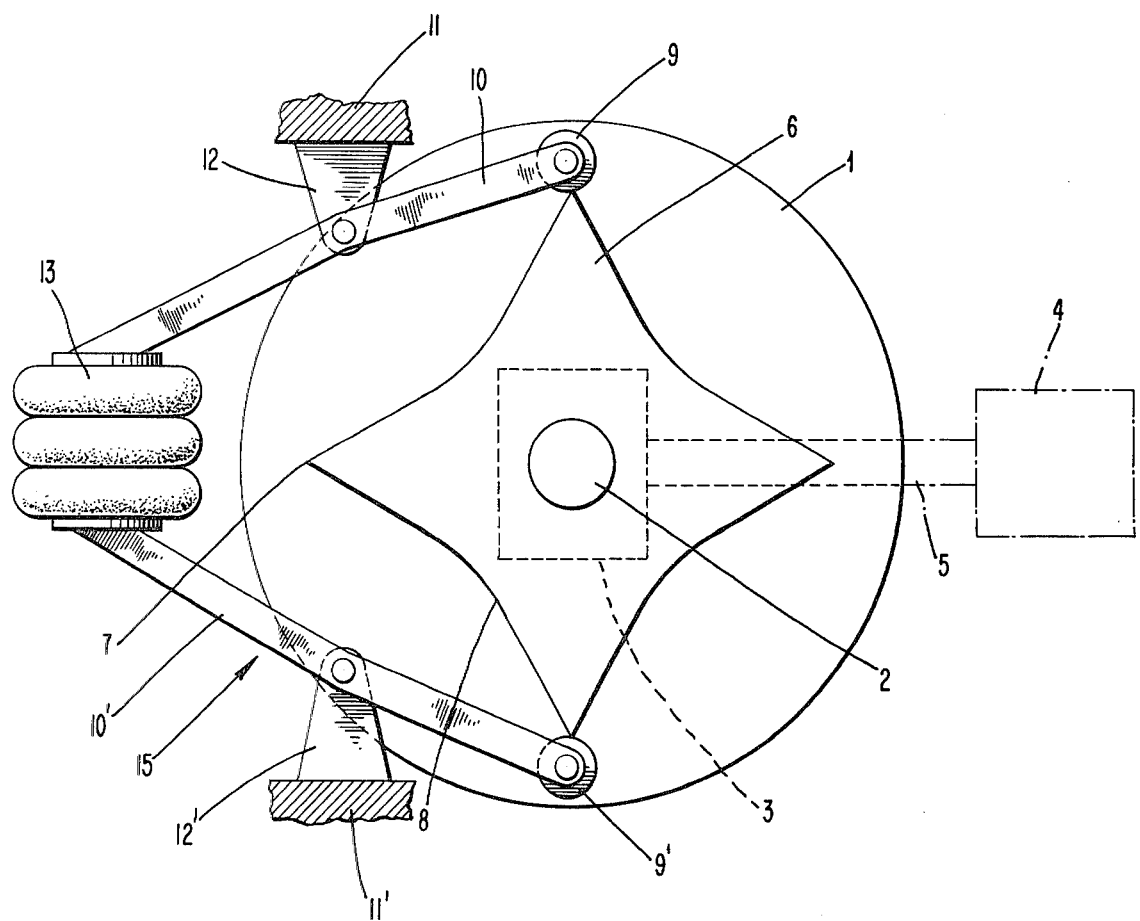
FIG. 2 is a schematic view of a second embodiment of the present invention.

A further embodiment (FIG. 2) is that the cam follower is complimented by a second cam follower 15 acting on the opposite side of the cam disc. The same pneumatic spring 13 may be used if its end which is connected to the frame 11 in FIG. 1 is joined instead to an end of a lever rod 10' of the second cam follower 15. Moreover, by dimensioning the arrangement so that the two cam follower pulleys 9,9' rest against the cam disc 6 at a spacing of 180°, a balancing of forces takes place which relieves the stress exerted by the spring 13 on the bearing of the shaft 2 as well as on the machine frame. This arrangement makes possible a further reduction of the dimensions of these parts and brings down costs.

The preferred embodiment of the invention has been described above in connection with a machine element in the form of a wheel which is rotatable about its centre shaft. Naturally, the invention can also be used for other movements and, moreover, further machine elements, e.g. chains and wheels, may be attached to the rotatable wheel described. When determining the shape of the cam and the size of the spring, the total mass as well as the friction losses of the attached elements must be taken into account.

In certain cases, e.g. when there is a large number of indexing stops per revolution, it may be advantageous to connect the cam disc to the indexing machine element via a gear which reduces the number of cam peaks to a number which is appropriate with a view to the cam shape and the spring forces.

It has been found in practice that the absorption of energy during braking of the indexing machine element and the utilization of the energy thus stored in the spring element in the succeeding indexing movement can be realized so effectively that the force which is required to be supplied via the driving motor amounts to no more than a fraction of the force which is necessary in indexing without utilization of the present invention. In a practical application it was possible, whilst maintaining the same service life, to design the driving motor, shafts and indexing gearbox for no more than a quarter of the previous stresses. This is due not only to the storage and re-use of energy, but also to the fact that the machine noticeably runs more smoothly which results in substantially lower stresses than those to which the driving assembly is normally subjected during an indexing drive.

What is claimed is:

1. An apparatus for compensating inertia forces comprising:
    a rotary element;
    means for drivingly indexing said element between a plurality of discrete angular stop positions;
    a cam, said cam having a cam surface contoured with a plurality of peaks corresponding to said discrete angular positions;
    means for mounting said cam for rotation with said element;
    a first cam follower in engagement with said cam surface, said cam surface and said cam follower cooperating to initially assist rotation of said element and to subsequently resist rotation of said element between consecutive ones of said discrete angular positions; and
    means for urging the first cam follower against one of the peaks of the cam surface when the element is at each of the discrete angular positions and imposing substantially zero torque on said element at each of the discrete angular positions.

2. The apparatus of claim 11 wherein the first cam follower comprises a pivotably supported lever rod having one end urged against the cam surface and having the other end connected to said means for urging the first cam follower against the cam surface.

3. The apparatus of claim 2 wherein the means for urging the first cam follower comprises a pneumatic cylinder.

4. The apparatus of claim 2 wherein the one end of the lever rod has a rolling element, and wherein a periphery of the rolling element is urged against the cam surface.

5. The apparatus of claim 1 wherein the number of cam peaks is equal to the number of indexing movements per one cycle of the element.

6. The apparatus of claim 1 wherein the means for drivingly indexing said element is an electric motor.

7. The apparatus of claim 1 further comprising a second cam follower urged into engagement with the cam surface at a location of 180° from the first cam follower.

8. A method of compensating inertia forces comprising the steps of:
    drivingly indexing a rotary element between a plurality of discrete angular stop positions, said element having a cam with a cam surface mounted for rotation with said element;
    initially assisting rotation of said element with a cam follower between consecutive discrete angular positions;
    subsequently resisting rotation of said element with the cam follower between said consecutive discrete angular positions; and
    imposing substantially zero torque on said element with the cam follower at each of said discrete angular positions.

9. The method of claim 8 wherein the step of assisting rotation of the element comprises the step of rolling the cam follower radially inwardly from one of the discrete angular positions comprising a first peak on the cam surface and wherein the step of resisting rotation of the element comprises the step of rolling the cam follower radially outwardly toward another consecutive discrete angular position comprising a second peak on the cam surface.

* * * * *